United States Patent [19]

Zelinski et al.

[11] 4,012,566

[45] Mar. 15, 1977

[54] METHOD FOR MODIFYING THE PROPERTIES OF RUBBERY POLYMERS OF CONJUGATED DIENES

[75] Inventors: Robert P. Zelinski, Bartlesville, Okla.; Rudolph H. Gath, Eilenburgerweg, Germany

[73] Assignee: Phillips Petroleum Company, Bartlesville, Okla.

[22] Filed: Mar. 10, 1975

[21] Appl. No.: 557,157

Related U.S. Application Data

[63] Continuation of Ser. No. 72,904, Sept. 16, 1970, abandoned, which is a continuation-in-part of Ser. No. 689,335, Dec. 11, 1967, abandoned.

[52] U.S. Cl. .................................. 526/48; 526/20; 526/21; 526/30; 526/141; 526/169

[51] Int. Cl.$^2$ ........................................ C08F 8/42
[58] Field of Search ........... 260/94.7 N, 94.6, 85.1, 260/94.7 D

[56] References Cited

UNITED STATES PATENTS 3,558,589  1/1971  Bethea et al. ................... 260/94.7

*Primary Examiner*—Paul R. Michl

[57] ABSTRACT

The physical properties of rubbery polymers of conjugated dienes are modified by treatment with a homogeneous olefin disproportionation catalyst thereby modifying at least one of the properties of cold flow, inherent viscosity or Mooney viscosity.

33 Claims, No Drawings

METHOD FOR MODIFYING THE PROPERTIES OF RUBBERY POLYMERS OF CONJUGATED DIENES

This application is a continuation of Ser. No. 72,904, filed Sept. 16, 1970, now abandoned which was a continuation-in-part of Ser. No. 689,335, filed Dec. 11, 1967, now abandoned.

This invention relates to rubbery polymers of conjugated dienes and to a method for modifying their physical properties. In one aspect this invention relates to a method for reducing cold flow and increasing the viscosity characteristics of homopolymers of conjugated dienes and copolymers of conjugated dienes with monovinyl aromatic compounds. In still another aspect this invention relates to a method for modifying the properties of rubbery polymers of conjugated dienes by treating such dienes with a homogeneous olefin disproportionation catalyst.

In the preparation of rubbery polymers it is a common practice to blend together several batches of polymer in order to arrive at a polymer having certain desired physical properties. For example, batches of polymer having different values of Mooney viscosity can be blended to arrive at a desired value of Mooney viscosity; however, other properties of such a blend would have to be accepted as they result or be modified in some other manner. It must also be recognized that in making such a blend the resulting Mooney viscosity would not be higher than the highest component of the blend and the cold flow property value would not be less than the lowest cold flow value of a component of the blend. Thus, there is a definite limitation on the manipulation of the physical properties of rubbery polymers by blending different batches of such polymers.

Broadly the present invention is directed to a process for modifying physical properties of rubbery polymers of conjugated dienes by treating the polymers with a homogeneous olefin disproportionation catalyst, e.g., a homogeneous catalyst active for disporportionating propylene into ethylene and butenes.

This invention provides a method for modifying the properties of a conjugated diene polymer by treating it with a homogeneous olefin disproportionation catalyst. While it is not intended that the invention be limited to any particular reaction mechanism, it is believed that a redistribution of molecular weight occurs, and if the polymer contains side chain unsaturation, the treatment results in a considerable amount of long chain branching as well as cyclization with adjacent side chain unsaturation. It is also possible that graft polymerization will result, particularly when mixtures of conjugated diene polymers are utilized. These polymers can contain the same or different monomers.

Accordingly, the polymers treated in accordance with the invention exhibit modified cold flow when compared to the untreated polymers. The treated polymer cold flow can be increased or decreased, although the invention finds greater usefulness in decreasing cold flow. Additionally, the polymers exhibit a change in molecular weight as exhibited by inherent viscosity when compared to the untreated polymers; the change in inherent viscosity can be an increase, with corresponding increase in Mooney viscosity, or it can be a decrease, with corresponding decrease in Mooney viscosity. The direction of change (increase or decrease) in inherent viscosity is dependent on the nature and type of polymer and the conditions of treatment.

Any conjugated diene homopolymer or copolymer of a conjugated diene with a monomer containing a vinylidene($CH_2=C$) group can be treated according to this invention. Conjugated dienes include butadiene-1,3; isoprene; 2,3-dimethylbutadiene-1,3; and the like. Monomers which can be used as comonomers with the conjugated dienes include styrene, vinyl-naphthalenes, vinylpyridines, and alkyl-substituted derivatives of these monomers as well as acrylonitrile, methacrylonitrile, methyl acrylate, methyl methacrylate, and the like. It is preferred that the hydrocarbon solution of the polymer be employed for the treatment. The polymer can be dissolved in a diluent such as a hydrocarbon or, in instances where the polymer is prepared in a diluent in the presence of an organometallic catalyst such as butyllithium, the treating agent can be added to the unquenched or quenched polymerization mixture. The treating temperature can be the same or used for the polymerization or it can be adjusted to some other level as desired. The preferred treating temperature is generally in the range of 50° to 250° F. The treating time is dependent upon the temperature and the result desired and can range from 1 minute or less to 100 hours or more. For most purposes the treating time is less than 25 hours and in many instances the desired results are obtained in less than 5 hours.

Any homogeneous olefin disproportionation catalyst can be employed for treating conjugated diene polymers according to this invention. Component (a) of the homogeneous olefin disproportionation catalyst which are typical of the present invention can be represented by the formula $[(L)_a(L')_bM_cZ_d]$ wherein (L) and (L') are organic or inorganic ligands; M is a transition metal of Group IB, IIIB, IVB, VB, VIB, or VIIB or the iron and cobalt subgroups of Group VIII; Z is halide or a radical such as CN, SCN, OCN, and $SnCl_3$; $a$ and $d$ are numbers 0–6, $b$ is 1–2, $c$ is 1–4; $x$ is a number indicative of the polymeric state of the compound; and wherein the number of (L), (L') and Z groups present in the component (a) compound shall not be greater than the number required for the metal to achieve the closed shell electronic configuration of the next higher atomic number inert gas and there must be at least one of L, L' or Z; preferred (L) groups are $R_3Q$, $R_3QO$, $R_2Q-QR_2$, $R_2NR'$, O, CO, $R_2N-R^2-NR_2$, R-S-R, $R^3S$, [π-($CHR^4-CR^4-CH_2$)]̄, $R^5(CN)_k$, $R^5(COO)_{\overline{k}}$, $RCOR^6$-($COO)_{\overline{k}}$, [$(RCO)_2CH$]̄, ($R_2NCSS$)̄ unsubstituted and $R^5$ group-substituted pyridine, unsubstituted and $R^5$ group-substituted bipyridine, or unsubstituted and R group-substituted cyclopentadienyl radicals; (L') ligands are NO, or [π-($CHR^4-CR^4-CH_2$)] wherein R is an aromatic or saturated aliphatic radical, including radicals substituted with groups such as halo groups or alkoxy groups and the like, having up to 20 carbon atoms; R' is hydrogen or an R radical; $R^2$ is a divalent R radical; $R^3$ is a divalent saturated aliphatic or ethylenically unsaturated aliphatic radical having from 4 to 10 carbon atoms; $R^4$ is hydrogen or methyl radical; $R^5$ is an aromatic, saturated aliphatic, or ethylenically unsaturated aliphatic radical having up to 30 carbon atoms; $R^6$ is a divalent saturated aliphatic radical having from 1 to 10 carbon atoms; Q is phosphorus, arsenic, or antimony; and $k$ is 1–2.

The preferred component (a) compounds are complex compounds of the metals of Groups VIB, VIIB, and the iron and cobalt subgroups of Group VIII. The more preferred metals of these are molybdenum, tungsten, rhenium, ruthenium, or rhodium with the most preferred metal complex being a complex of molybdenum, such as NO-treated molybdenum trichloride distearate. Accordingly, the most preferred L' ligand is NO, and the most preferred L ligand correspond to the formula $R^5(COO)_{\overline{n}}$.

In many instances the suitable (a) component need not be an isolated complex compound but can, for convenience and economy, simply be the admixture of a suitable, relatively simple, compound of a transition metal and one or more complexing agents. Thus, under complex-forming conditions, the admixture of these ingredients, complete with the diluent which is generally used to facilitate the mixing, can frequently be utilized without additional separation, isolation, or other treatment. For example, a suitable (a) component can be the admixture obtained by bubbling NO through a cyclohexane solution of molybdenum trichloride distearate.

The transition metal compounds which are applicable for use as the (a) component of the catalyst system of the present invention are generally compounds which are available or which can be prepared by methods which are conventional in the art.

When it is desired to prepare and utilize transition metal complex compounds in the form of nonisolated admixtures of its components, a transition metal compound and one or more complexing agents are merely combined in proportions and under conditions of temperature and time which permit the catalytically active transition metal complex to be formed, generally in a diluent in which the components are at least partly soluble. Suitable transition metal starting compounds, for example, are halides, oxyhalides, carbonyls, carbonyl halides, or salts of inorganic or organic acids, preferably halides.

Some specific examples of suitable transition metal complex (a) components are: (triphenylphosphine)$_2$-(NO)$_2$MoCl$_2$, (NO)$_2$MoCl$_2$, (pyridine)$_2$-(NO)$_2$MoCl$_2$, NO-treated (triphenylphosphine)$_2$MoCl$_4$, NO-treated (pyridine)$_2$MoCl$_4$, NO-treated (butyronitrile)$_2$MoCl$_4$, NO-treated (stearate)$_2$MoCl$_3$, NO-treated pyridine-treated MoCl$_5$, NO-treated (benzoate)$_2$MoCl$_3$, NO-treated (acetylacetonate)$_2$MoO$_2$, NO-treated MoOCl$_3$, NO-treated tetrallyltin-treated MoCl$_5$, No-treated MoCl$_5$, NOCl-treated pyridine-treated MoO$_2$, NO-treated tributylphosphine-treated MoCl$_5$, NO-treated thiophene-treated MoCl$_5$, NO-treated pyridine-treated WCl$_6$, NO-treated benzoic acid-treated WCl$_6$, (triphenylphosphine)$_2$(NO)$_2$WCl$_2$, (triphenylphosphine)$_2$-ReOCl$_3$, (triphenylphosphine)$_2$ReCl$_4$, (triphenylphosphine)$_2$ReOBr$_3$, (acetylacetonate)$_4$Re$_2$Cl$_4$, (triphenylphosphine)-ReOBr$_3$, CO-treated triphenylphosphine-treated RuCl$_3$, NO-treated RuCl$_3$, NO-treated RuCl$_3$, (triphenylphosphine)$_4$(CO)$_2$Ru$_2$(SnCl$_3$)Cl$_3$, NO-treated triphenylphosphine-treated RuCl$_3$, NOCl-treated (triphenylphosphine)$_3$RhCl, NO-treated (triphenylphosphine)$_3$RhCl, ($\pi$-allyl)$_2$RhCl, NO-treated triphenylphosphine-treated RhCl$_3$, (triphenylphosphine)$_3$Cu$_2$Cl$_2$, (triphenylphosphine)AuCl, [(triphenylphosphine)AgBr]$_x$, (triphenylphosphine)Cr(CO)$_4$, (triphenylphosphine)$_2$MoCl$_4$, SmCl$_3$, ThCl$_4$, UCl$_3$, UCl$_4$, (cyclopentadienyl)TiCl$_3$, pyridine-treated TiCl$_4$, (acetylacetonate)$_4$Zr, NO-treated benzoic acid-treated NbCl$_5$, NO-treated (triphenylphosphine)$_2$CoCl$_2$, NO-treated triphenylphosphine-treated IrCl$_3$ and NO-treated CO-treated triphenylphosphine-treated IrCl$_3$, and the like, and mixtures thereof.

The elements referred to herein are in accordance with the Periodic Table of Elements appearing in Handbook of Chemistry and Physics, Chemical Rubber Company, 45th edition (1964), page B-2.

The formula $[(L)_a(L')_bM_cZ_d]_x$ is used herein to identify the product obtained by the admixture, under catalyst forming conditions, of the metal compound with one or more ligand-forming materials whether or not the components are present in the complex as indicated in the formula.

When the (a) component of the catalyst is the product obtained by combining a compound of a transition metal, as hereinbefore discussed, with one or more suitable ligand-forming materials, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.2:1 to about 2:1. The products are obtained by combining these ingredients at a temperature preferably in the range of from about 0° to about 130° C., more preferably 20° to about 60° C., for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system. In general, the (a) component of the catalyst system is fully prepared before contact is made with the (b) component.

The (b) component is an aluminum-containing compound, (1) represented by the formula RAlX$_2$; (2) a mixture of (1) and a compound represented by the formula R$_n$AlX$_m$ wherein R is as previously described, X is halogen, n is 2 or 3, m is 0 or 1, and the sum of n and m is 3; or (3) a compound represented by the formula R$_n$AlX$_m$ which is as defined above.

Some specific examples of RAlX$_2$ compounds are: methylaluminum dichloride, ethylaluminum dichloride, n-butylaluminum dichloride, n-heptylaluminum dibromide, cyclohexylaluminum dibromide, 4-methylcyclohexylaluminum difluoride, n-eicosylaluminum difluoride, isopropylaluminum diiodide, benzylaluminum dichloride, 2,4,6-trimethylphenylaluminum dichloride, n-decylaluminum dichloride and 2-naphthylaluminum.

Some non-limiting examples of (2) above are mixtures of a compound having the formula RAlX$_2$ and a compound having the formula R$_2$AlX. Preferably, the mixture contains at least 50 mole percent of the former compound, although mixtures containing less than 50 mole percent can be used. The equimolar mixtures of those compounds are commonly called sesquihalides, and some specific examples of these compounds include methylaluminum sesquichloride, ethylaluminum sesquichloride, and ethylaluminum sesquibromide.

Some specific examples of R$_n$AlX$_m$ compounds are; trimethylaluminum, triethylaluminum, tri-n-propylaluminum, triisobutylaluminum, tri-n-hexylaluminum, tri-n-octylaluminum, tricyclohexylaluminum, triphenylaluminum, tri-n-decylaluminum, tri-n-eicosylaluminum, methyldiphenylaluminum, tribenzylaluminum, tri-l-naphtylaluminum, di-n-octylphenylaluminum, tri-4-tolylaluminum, dimethylaluminum chloride, di-n-propylaluminum bromide, diethylaluminum chloride, diisobutylaluminum chloride, methylisobutylaluminum chloride, di-n-heptylaluminum fluroide, dipheylaluminum bromide, dibenzylaluminum chloride and di-n-octylaluminum iodide.

The molar proportion of the (b) component to the (a) component to form the catalyst system of the present invention will generally be in the range of from about 0.1:1 to 20:1, preferably from about 1:1 to about 10:1.

Reaction temperature is not particularly important; however extremely high temperatures at which decomposition of the product or the catalyst might occur should be avoided and likewise extremely low temperatures at which reaction rates would be undesirably low should also be avoided. The reaction temperature will usually be the same temperature as that utilized in polymerizing the monomers or comonomers.

The following specific embodiments of the invention will be helpful in attaining a better understanding of the invention but the specific embodiments should be considered as exemplary and not as unduly limiting the invention.

EXAMPLE I

The molybdenum trichloride distearate employed was prepared by reacting stearic acid with molybdenum pentachloride in cyclohexane. The recipe was as follows:

| | |
|---|---|
| Cyclohexane, ml | 500 |
| Stearic acid, grams | 100 (0.35 mole) |
| Molybdenum pentachloride, grams | 50 (0.18 mole) |

The materials were charged to the reactor which was then purged with nitrogen for 10 minutes. The temperature was adjusted to 122° F. and maintained at that level for 15 hours. The reactor was then vented and purged with nitrogen for 15 minutes. The molybdenum trichloride distearate was soluble in cyclohexane. The calculated molarity of the solution was 0.36. A vessel containing the molybdenum trichloride distearate was pressured to 30 psig with NO for approximately 1 hour at room temperature (about 75° F.) to obtain the reaction product used as one of the components in the catalyst system. This material was mixed with a cyclohexane solution of ethylaluminum sesquichloride in a ratio such that the gram atoms of Al to gram atoms of Mo was 5:1. This mixture was employed for treating polybutadiene.

Runs were conducted according to the invention in which butadiene was polymerized in the presence of n-butyllithium as the catalyst, and the unquenched reaction mixture was treated with the disproportionation catalyst formed on mixing the cyclohexane solution of ethylaluminum sesquichloride and the product obtained by reacting nitric oxide with molybdenum trichloride distearate as set forth above. The polymerization recipe was as follows:

| | |
|---|---|
| 1,3-Butadiene, parts by weight | 100 |
| Cyclohexane, parts by weight | 800 |
| n-Butyllithium, mhm | 1.5 |
| Temperature, ° C. | 70 |
| Time, hours | 3 | mhm = gram millimoles per 100 grams monomer.

Cyclohexane was charged to the reactor first after which it was purged with nitrogen. Butadiene was added and then the butyllithium. After a three-hour polymerization period, one run was reserved as a control. It was shortstopped with a 10 weight per cent solution of 2,2'-methylene-bis(4-methyl-6-tert-butylphenol) in a mixture of equal parts by volume of isopropyl alcohol and toluene. The amount of this solution used was sufficient to provide about one part by weight of the antioxidant per 100 parts by weight of the polymer. Variable quantities of the mixture of ethylaluminum sesquichloride and the reaction product of nitric oxide with molybdenum trichloride distearate (5:1 ratio of gram atoms Al:Mo) were added to the other runs and the temperature was maintained at 158° F. for variable periods. Following the treating period, each reaction was shortstopped according to the procedure used in the control run. All polymers were recovered by coagulation in isopropyl alcohol. They were separated and dried. Cold flow, inherent viscosity, and Mooney values were determined. All polymers were gel free. Results were as follows:

Table I

| Run No. | Al, g. atoms | Mo, g. atoms | Time, Hours | Cold Flow,[a] mg/min. | ML-4 at[b] 212° F. | Inherent[c] Viscosity |
|---|---|---|---|---|---|---|
| 1 | 0 | 0 | 0 | 342 | 4 | 1.29 |
| 2 | 1.25 | 0.25 | 0.5 | 34 | 19 | 1.76 |
| 3 | 2.50 | 0.50 | 0.5 | 40 | 17 | 1.72 |
| 4 | 5.0 | 1.0 | 0.5 | 26 | 15 | 1.60 |
| 5 | 2.5 | 0.5 | 0.25 | 32 | 17.5 | 1.69 |
| 6 | 2.5 | 0.5 | 1.0 | 33 | 17 | 1.68 |

[a]Cold flow is measured by extruding the polymer through a ¼-inch orifice at 3.5 psi pressure and a temperature of 122° F. After allowing 10 minutes to reach steady state, the rate of extrusion is measured and reported in milligrams per minute.
[b]Mooney Viscosity ASTM D 1646-63.
[c]Determined according to procedure of U.S. 3,278,508, column 20, notes a and b.

These data show that treatment of the polymer with the disproportionation catalyst reduced cold flow, increased Mooney value, and increased inherent viscosity without producing gel.

EXAMPLE II

A polyisoprene was prepared according to the recipe shown below and then treated with an MoCl$_3$(octanoate)$_2$-(NO treated)/(CH$_3$CH$_2$) Al$_2$Cl$_3$ (EASC) catalyst.

| Polymerization Recipe | |
|---|---|
| | Parts, by Weight |
| Isoprene | 100 |
| Cyclohexane | 800 |
| n-Butyllithium | 0.064 |
| Temperature, °C. | 70 |
| Time, hours | 2 |

Charge order: cyclohexane, nitrogen purge, isoprene, n-butyllithium.

Polyisoprene (40 g), prepared as described, was treated (in the absence of a separate termination or "shortstopping" step and polymer isolation) with EASC/MoCl$_3$ (octanoate)$_2$(NO treated) as indicated below in Table II.

Table II

| Run No. | Al$^{(a)}$ g atom/hm$^{(e)}$ | Mo$^{(b)}$ g atom/hm | Al/Mo Ratio | I.V.$^{(c)}$ | Mooney$^{(d)}$ Viscosity | Cold Flow mg/min. |
|---|---|---|---|---|---|---|
| 1 | — | — | — | 1.23 | 4 | 132 |
| 2$^{(f)}$ | 2.46 | 0.48 | 5.1 | 1.49 | 12 | 27 |

$^{(a)}$An 0.302 M solution of EASC in cyclohexane.
$^{(b)}$Prepared by refluxing a mixture of cyclohexane (76.7 g), octanoic acid (103.8) and molybdenum pentachloride (100 g) for 1.17 hours under nitrogen. This soluble product was 0.315 M in MoCl$_3$ (octanoate)$_2$. A portion of this solution was transferred to another vessel and pressured repeatedly with NO while being shaken until the pressure no longer decreased on standing at room temperature. This solution was diluted to 0.032 M in molybdenum content with cyclohexane.
$^{(c)}$Inherent viscosity. Polymers were gel free.
$^{(d)}$ML-4 at 212° F.
$^{(e)}$g atom/hm = milligram atoms per 100 g of monomers.
$^{(f)}$In this run, the EASC was added to the polyisoprene solution first and this mixture agitated at 70° C. for 0.25 hours. The MoCl$_3$ (octanoate)$_2$-(NO treated) was then added and the mixture agitated at 70° C. for 1 hour.

b. Prepared by refluxing a mixture of cyclohexane (76.7 g.), octanoic acid (103.8) and molybdenum pentachloride (100 g) for 1.17 hours under nitrogen. This soluble product was 0.315 M in MoCl$_3$ (octanoate)$_2$. A portion of this solution was transferred to another vessel and pressured repeatedly with NO while being shaken until the pressure no longer decreased on standing at room temperature. This solution was diluted to 0.032 M in molybdenum content with cyclohexane.

c. Inherent viscosity. Polymers were gel free.

d. ML-4 at 212° F.

e. g atom/hm = milligram atoms per 100 g of monomers.

f. In this run, the EASC was added to the polyisoprene solution first and this mixture agitated at 70° C. for 0.25 hours. The MoCl$_3$ (octanoate)$_2$-(NO treated) was then added and the mixture agitated at 70° C. for 1 hour.

This example demonstrates that the process of the invention is applicable to conjugated diene homopolymers such as polyisoprene.

EXAMPLE III

A butadiene/styrene block polymer was prepared employing the recipe shown below.

| Polymerization Recipe | |
|---|---|
| | Parts, by Weight |
| Cyclohexane | 800 |
| Butadiene | 75 |
| Styrene | 25 |
| n-Butyllithium | 1.08 |
| Temperature, °C. | 70 |
| Time, hours | 2 |

Charge Order: cyclohexane, nitrogen purge, styrene, butadiene, n-butyllithium.

A butadiene/styrene block copolymer (40 g), prepared as described, was treated as described above for polyisoprene. The results obtained are given in Table III.

Table III

| Run No. | Al g atom/hm | Mo g atom/hm | Al/Mo Ratio | I.V.$^{(a)}$ | Mooney Viscosity | Cold Flow mg/min. |
|---|---|---|---|---|---|---|
| 1 | — | — | — | 0.82 | 42 | 0.00 |
| 2 | 2.46 | 0.48 | 5.1 | 0.96 | 45 | 0.00 |

$^{(a)}$Polymers were gel free.

This example demonstrates that the invention is applicable to conjugated diene copolymers such as a butadiene/styrene block copolymer.

EXAMPLE IV

A series of runs were conducted in which polybutadienes were prepared according to the recipe shown below and then treated with the MoCl$_3$(octanoate)$_3$-(NO treated)/EASC using varying Al/Mo mole ratios.

| Polymerization Recipe | |
|---|---|
| | Parts, by Weight |
| Cyclohexane | 800 |
| Butadiene | 100 |
| n-Butyllithium | 0.064 |
| Temperature, °C. | 70 |
| Time, hours | 2 |

Charge Order: cyclohexane, nitrogen purge, butadiene, n-butyllithium.

Polybutadienes (40 g each), prepared as described above, were treated in the same manner as described above for polyisoprene. The results obtained in these runs are given in Table IV below.

Table IV

| Run No. | Al g atom/hm | Mo g atom/hm | Al/Mo Ratio | I.V.[a] | Mooney Viscosity | Cold Flow mg/min. |
|---|---|---|---|---|---|---|
| 1 | — | — | — | 1.51 | 8 | 133.7 |
| 2 | 0.25 | 0.51 | 0.5 | 1.85 | 26 | 17.7 |
| 3 | 0.49 | do. | 1.0 | 1.71 | 18 | 28.4 |
| 4 | 0.99 | do. | 1.9 | 1.82 | 24 | 17.9 |
| 5 | 1.47 | do. | 2.9 | 1.79 | 26 | 7.8 |
| 6 | 2.47 | do. | 4.8 | 1.76 | 26 | 4.4 |
| 7 | 4.9 | do. | 10 | 1.71 | 26 | 3.4 |
| 8 | 9.9 | do. | 20 | 1.67 | 26 | 3.1 |

[a] All polymers were gel free.

a. All polymers were gel free.

This example demonstrates that the process of the invention is applicable to conjugated diene homopolymers such as polybutadienes using a wide range of Al/Mo mol ratios.

In each of the runs of Examples II–IV, after treatment the polymers were recovered by the following procedure. Each reaction mixture (containing a 40 g monomer charge) was terminated at the end of the treatment period by the addition of about 50 ml of an 80/20 by volume mixture of toluene/isopropyl alcohol. The resulting mixture was thoroughly mixed and then charged with 10 ml of a solution of an antioxidant, 2,2'-methylene-bis(4-methyl-6-tert-butyphenol), in isopropyl alcohol (0.1 g/ml). This mixture was also mixed thoroughly and then the polymer in each mixture was recovered by coagulation with isopropyl alcohol. Each polymer was separated and then dried under vacuum at 145° F. In each run, the weight of the recovered polymer was essentially 100 percent of the weight of the monomers charged.

EXAMPLE V

A polybutadiene having at least 85% cis-1,4 addition was prepared according to the recipe shown below and treated with the following catalysts: (A) MoCl$_3$(octanoate)$_2$-(NO treated)/(CH$_3$CH$_2$) Al$_2$Cl$_3$ and (B) MoCl$_3$(octanoate)$_2$-(NO treated)/(i-C$_4$H$_7$)$_3$Al.

| Polymerization Recipe | Parts (Mmoles) |
|---|---|
| Butadiene | 100 |
| Toluene | 900 |
| Iodine | 0.102 (0.40) |
| Triisobutylaluminum | 0.594 (3.00) |
| Titanium tetrachloride | 0.076 (0.40) |
| Temperature, ° C | 5 |
| Time, hours | 2 |

Charge Order: toluene, 1,3-butadiene, iodine solution, cool to 5° C., triisobutylaluminum and titanium tetrachloride.

The reactor effluent containing the stereospecific polybutadiene was treated (in the absence of a separate termination or "shortstopping" step and polymer isolation) with catalyst (A) and (B) according to the following recipe:

| Treatment Recipe | Parts (Mmoles) A | B |
|---|---|---|
| Polybutadiene plus residual butadiene | 100 | 100 |
| Toluene | 900 | 900 |
| Ethylaluminum sesquichloride | variable | — |
| Triisobutylaluminum | — | variable |
| Molybdenum trichloride di-octanoate treated with nitric oxide | (1.0) | (1.0) |
| Temperature, ° C | 50 | 50 |

-continued

| Treatment Recipe | Parts (Mmoles) A | B |
|---|---|---|
| Time, hours | 1 | 1 |
| Conversion, %[a] | About 75 | About 75 |

[a] Butadiene conversion to polymer.

The results of the treatment are summarized in the following Table V:

Table V

| Recipe | Run No. | Organoaluminum, Mmole | Inherent Viscosity | Cold Flow, Mg/Min |
|---|---|---|---|---|
| Control | 1 | Untreated Control for Recipe A | 2.22 | 14.7 |
|  |  | Ethylaluminum Sesquichloride |  |  |
| A | 2 | 0.5 | 2.17 | 5.6 |
| A | 3 | 1.0 | 2.19 | 4.4 |
| A | 4 | 2.0 | 1.95 | 9.0 |
| A | 5 | 4.0 | 1.67 | 85. |
| A | 6 | 10.0 | 1.79 | 1.6 |
| Control | 7 | Untreated Control for Recipe B | 2.08 | 29 |
|  |  | Triisobutylaluminum |  |  |
| B | 8 | 0.5 | 2.11 | 7.2 |
| B | 9 | 1.0 | 2.16 | 7.3 |
| B | 10 | 2.0 | 2.11 | 12.1 |
| B | 11 | 4.0 | 1.86 | 36 |
| B | 12 | 10.0 | 1.80 | 39 |

The treated cis-polybutadiene polymers were recovered by adding to each reaction mixture about 1 phr (parts per one hundred parts polymer) of antioxidant, 2,6-di-tert-butyl-4-methylphenol, added as a 10 weight percent solution of the antioxidant in a 50/50 by volume mixture of isopropyl alcohol and cyclohexane, and the mixture coagulated with isopropyl alcohol. The polymer from each mixture was separated and dried under vacuum.

The above Table V demonstrates that the properties of a butadiene polymer containing high amounts of cis-1,4 addition can be modified in accordance with the invention. Although not completely understood, it is believed that Runs 5, 11 and 12 did not increase cold flow due to the participation of residual butadiene monomer in the treatment step.

EXAMPLE VI

A polybutadiene polymer was prepared using an organolithium catalyst system according to the following recipe:

| Polymerization Recipe | Parts (Mmoles) |
|---|---|
| Butadiene | 100 |
| Cyclohexane | 760 |
| n-Butyllithium | 0.064 (1.0) |
| Temperature, ° C | 70 |

-continued

Polymerization Recipe

| | Parts (Mmoles) |
|---|---|
| Time, hours | 2 |

Charge Order: cyclohexane, 1,3-butadiene, n-butyllithium.

The reaction mixture was shortstopped with isopropyl alcohol and the reaction mixture diluent was evaporated. The polymer residue from the evaporation was dried under vacuum.

The dried polymer was redissolved in cyclohexane and treated with a NO-treated molybdenum trichloride dioctanoate/ethylaluminum sesquichloride catalyst system. The treatment recipe and results are summarized in Table VI.

Table VI

| | Parts (Mmole) |
|---|---|
| Polybutadiene | 100 |
| Cyclohexane | 760 |
| Ethylaluminum sesquichloride | (1.0) |
| Molybdenum trichloride di-octanoate treated with nitric oxide | (1.0) |
| Temperature, °C | 70 |
| Time, hour | 1 |

| | Inherent Viscosity | Cold Flow, Mg/Min |
|---|---|---|
| Control[a] | 1.92 | 50 |
| Treated Polymer | 1.92 | 23 |

[a]Untreated polybutadiene prepared with the same polymerization recipe.

The treated polymer was recovered in the same manner as described above in Example V.

This example demonstrates that the process of the invention is applicable to terminated and redissolved polymers of butadiene as well as polymers of butadiene which have not been quenched and separated from the polymerization diluent.

Reasonable variation or modification of the invention is possible without departing from spirit or scope thereof.

We claim:

1. A process to decrease the cold flow of a conjugated diene polymer wherein said conjugated diene polymer is a homopolymer or copolymer of a conjugated diene or of a conjugated diene with a monomer containing a vinylidene group, which process comprises contacting said conjugated diene polymer with a homogeneous olefin disproportionation catalyst, wherein said catalyst is an admixture of (a) an NO-containing transition metal complex represented by the formula $[L_a(NO)_bM_cZ_d]_x$ and (b) an aluminum-containing component,
   wherein in said (a) L is a ligand; M is a transition metal selected from Group VIB, VIIB, and the iron and cobalt subgroups of Group VIII; Z is a halide, CN, SCN, OCN, or $SnCl_3$; $a$ and $d$ are numbers 0 to 6; $b$ is 1 or 2; $c$ is 1 to 4; and $x$ is a number indicative of the polymeric state of the complex; and
   wherein said (b) aluminum-containing component is (1) represented by the formula $RAlX_2$; (2) a mixture of (1) and a compound represented by the formula $R_nAlX_m$ wherein R is an aromatic or saturated aliphatic radical, including radicals substituted with halo groups or alkoxy groups, and having up to about 20 carbon atoms, X is halogen, $n$ is 2 or 3, $m$ is 0 or 1 and the sum of $n$ and $m$ is 3; or
   (3) a compound represented by the formula $R_nAlX_m$ wherein R, X, $n$ and $m$ are as defined herein, and
   wherein the ratio of (b):(a) and the conditions of said contacting including temperature, pressure, and time, are effective to decrease said cold flow of said conjugated diene polymer.

2. The process of treating a conjugated diene polymer to decrease the cold flow thereof which process comprises contacting said polymer with a homogeneous olefin disproportionation catalyst under treating conditions wherein said homogeneous olefin disproportionation catalyst is (a) an NO-containing-transition metal complex and (b) an aluminum-containing component,
   wherein said (a) is represented by $[L_a(NO)_bM_cZ_d]$ wherein L is a ligand; M is a transition metal of Group IB, IIIB, IVB, VB, VIB, VIIB, or the iron-cobalt subgroups of Group VIII; Z is a halide, CN, SCN, OCN, or $SnCl_3$; $a$ and $d$ are numbers 0 to 6 inclusive; $b$ is 1 or 2; $c$ is a number 1 to 4 inclusive;
   said (b) is (1) represented by the formula $RAlX_2$; (2) a mixture of (1) and a compound represented by the formula $R_nAlX_m$ wherein R is an aromatic or saturated aliphatic radical having up to 20 carbon atoms, X is halogen, $n$ is 2 or 3, $m$ is 0 or 1, such that the sum of $n + m$ is 3; or (3) a compound represented by the formula $R_nAlX_m$; and
   wherein the ratio of said (b)-(a) and said treating conditions including time and temperature are effective to decrease the cold flow of said conjugated diene polymer.

3. A process for preparing a conjugated diene polymer which is a polymer of a conjugated diene or conjugated diene with a vinylidene group containing monomer, wherein the improvement comprises contacting a preformed conjugated diene polymer with a homogeneous olefin disproportionation catalyst, wherein said homogeneous olefin disproportionation catalyst is (a) an NO-containing-transition metal complex, and (b) an aluminum-containing component in a ratio of (b):(a) and under treating conditions in the substantial absence of monomer effective to decrease the cold flow of said preformed conjugated diene polymer,
   wherein said (a) is represented by $[L_a(NO)_bM_cZ_d]$ wherein L is a ligand; M is a transition metal of Group IB, IIIB, IVB, VB, VIB, VIIB, or the iron-cobalt subgroups of Group VIII; Z is a halide, CN, SCN, OCN, or $SnCl_3$; $a$ and $d$ are numbers 0 to 6 inclusive; $b$ is 1 or 2; and $c$ is a number 1 to 4 inclusive; and
   said (b) is (1) represented by the formula $RAlX_2$; (2) a mixture of (1) and a compound represented by the formula $R_nAlX_m$ wherein R is an aromatic or saturated aliphatic radical having up to 20 carbon atoms, X is halogen, $n$ is 2 or 3, $m$ is 0 or 1, such that the sum of $n + n$ is 3; or (3) a compound represented by the formula $R_nAlX_m$.

4. A process for preparing a conjugated diene polymer which is a polymer of a conjugated diene or conjugated diene with a vinylidene group-containing monomer, wherein the improvement comprises contacting a preformed conjugated diene polymer with a homogeneous olefin disproportionation catalyst,
   wherein said homogeneous olefin disproportionation catalyst is (a) an NO-containing-transition metal complex and (b) an aluminum-containing component in a ratio of (b):(a) and under treating conditions in the substantial absence of monomer effective to decrease the cold flow of said preformed polymer, wherein said (a) is represented by $[L_a(NO)_bM_cZ_d]$ wherein L is a ligand; M is molybdenum, tungsten, rhenium, ruthenium or rhodium; Z is a halide, CN, SCN, OCN, or $SnCl_3$; $a$ and $d$ are numbers 0 to 6 inclusive; $b$ is 1 or 2; $c$ is a number 1 to 4 inclusive; and said (b) is (1) represented by the formula $RAlX_2$; (2) a mixture of (1) and a compound represented by the formula $R_nAlX_m$ wherein R is an aromatic or saturated aliphatic radical having up to 20 carbon atoms, X is halogen, $n$ is 2 or 3, $m$ is 0 or 1, such that the sum of $n + m$ is 3; or (3) a compound represented by the formula $R_nAlX_m$.

5. The process of claim 1 wherein said L ligand is represented by the formula $R^5(COO)_k$ wherein $R^5$ is a saturated aliphatic or ethylenically unsaturated aliphatic radical having up to 30 carbon atoms, and wherein the (b) component of the catalyst is (2).

6. The process of claim 5 wherein said M is molybdenum, tungsten, rhenium, ruthenium, or rhodium.

7. The process of claim 5 wherein said conjugated diene polymer is a polymer of butadiene, isoprene, or a copolymer of butadiene and styrene, and wherein the ratio of said (b) complex to said (a) component is in the range of about 0.1:1 to about 20:1.

8. The process according to claim 2 wherein said L is $R_3Q$, $R_3QO$, $R_2Q-QR_2$, $R_2NR'$, O, CO, $R_2N-R^2-NR_2$, $R-S-R$, $R^3$ S, $[\pi\text{-}(CHR^4-CR^4-CH_2)]$, $R^5(CN)_k$, $R^5(COO)_k$, $RCOR^6(COO)_k$, $[(RCO)_2CH]$, $(R_2NCSS)$ unsubstituted and $R^5$ group-substituted pyridine, unsubstituted and $R^5$ group-substituted bipyridine, or unsubstituted and R group-substituted cyclopentadienyl radicals, wherein R is an aromatic saturated aliphatic radical, R' is hydrogen or an R radical, $R^2$ is a divalent R radical, $R^3$ is a divalent saturated aliphatic or ethylenically unsaturated aliphatic radical having 4 to 10 carbon atoms, $R^4$ is hydrogen or methyl radical, $R^5$ is an aromatic, saturated aliphatic, or ethylenically unsaturated aliphatic radical having up to 30 carbon atoms, $R^6$ is a divalent saturated aliphatic radical having 1 to 10 carbon atoms, Q is phosphorus, arsenic, or antimony, and $k$ is 1 or 2.

9. The process according to claim 8 wherein said M is molybdenum tungsten, rhenium, ruthenium, or rhodium.

10. The process according to claim 8 wherein said (a) is (triphenylphosphine)$_2$(NO)$_2$MoCl$_2$, (NO)$_2$MoCl$_2$, (pyridine)$_2$(NO)$_2$MoCl$_2$, NO-treated (triphenylphosphine)$_2$MoCl$_4$, NO-treated (pyridine)$_2$MoCl$_4$, NO-treated (butyronitrile)$_2$MoCl$_4$, NO-treated (stearate)$_2$MoCl$_3$, NO-treated pyridine-treated MoCl$_5$, NO-treated (benzoate)$_2$MoCl$_3$, NO-treated (acetylacetonate)$_2$MoO$_2$, NO-treated MoOCl$_3$, NO-treated tetrallyltin-treated MoCl$_5$, NO-treated MoCl$_5$, NOCl-treated pyridine-treated MoO$_2$, NO-treated tributylphosphine-treated MoCl$_5$, NO-treated thiophene-treated MoCl$_5$, NO-treated pyridine-treated WCl$_6$, NO-treated benzoic acid-treated WCl$_6$, (triphenylphosphine)$_2$(NO)$_2$WCl$_2$, NO-treated RuCl$_3$, NO-treated triphenylphosphine-treated RuCl$_3$, NOCl-treated (triphenylphosphine)$_3$RhCl, NO-treated (triphenylphosphine)$_3$RhCl, NO-treated triphenylphosphine-treated RhCl$_3$, NO-treated benzoic acid-treated NbCl$_5$, NO-treated (triphenylphosphine)$_2$CoCl$_2$, NO-treated triphenylphosphine-treated IrCl$_3$, or NO-treated CO-treated triphenylphosphine-treated IrCl$_3$.

11. The process according to claim 8 wherein said (b) is methylaluminum dichloride, ethylaluminum dichloride, n-butylaluminum dichloride, n-heptylaluminum dibromide, cyclohexylaluminum dibromide, 4-methylcyclohexylaluminum difluoride, n-eicosylaluminum difluoride, isopropylaluminum diiodide, benzylaluminum dichloride, 2,4,6-trimethylphenylaluminum dichloride, n-decylaluminum dichloride, or 2-naphthylaluminum.

12. The process according to claim 8 wherein said (b) is trimethylaluminum, triethylaluminum, tri-n-propylaluminum, triisobutylaluminum, tri-n-hexylaluminum, tri-n-octylaluminum, tricyclohexylaluminum, triphenylaluminum, tri-n-decylaluminum, tri-n-eicosylaluminum, methyldiphenylaluminum, tribenzylaluminum, tri-l-naphtylaluminum, di-n-octylphenylaluminum, tri-4-tolylaluminum, dimethylaluminum chloride, di-n-propylaluminum bromide, diethylaluminum chloride, diisobutylaluminum chloride, methylisobutylaluminum chloride, di-n-heptylaluminum fluoride, dipheylaluminum bromide, dibenzylaluminum chloride, or di-n-octylaluminum iodide.

13. The process according to claim 8 wherein said homogeneous disproportionation catalyst employs a molar ratio of said (b):(a) is in the range of about 0.1:1 to 20:1.

14. The process according to claim 9 wherein said molar ratio of said (b):(a) is in the range of about 1:1 to 10:1.

15. The process according to claim 8 wherein said (a) $[L_a(NO)_bM_cZ_d]$ represents a product obtained by combining at least one salt of a transition metal with at least one ligand-forming material under conditions of time and temperature which permit the complex represented by $[L_a(NO)_bM_cZ_d]$ to form, employing a molar proportion of said transition metal salt to said ligand forming material in the range of about 0.1:1 to 10:1.

16. The process according to claim 15 wherein said molar proportion of said transition metal salt to said ligand forming material is in the range of about 0.2:1 to 2:1, and said combining temperature is in the range of about 0° to 130° C.

17. The process according to claim 13 wherein said polymer is a polybutadiene, said (a) is molybdenum trichloride di-octanoate treated with nitric oxide, said (b) is ethylaluminum sesquichloride, and said ratio of (b):(a) is about 1:2 to 20:1.

18. The process according to claim 13 wherein said contacting is conducted at a temperature in the range of about 50° to 250° F., for a time in the range of about 1 minute to 100 hours, employing treating conditions wherein said polymer is dissolved in a hydrocarbon diluent.

19. The process according to claim 13 wherein said conjugated diene polymer is a conjugated diene homopolymer, or copolymer of a conjugated diene with a vinylidine group-containing monomer.

20. The process according to calim 13 wherein said polymer is said copolymer wherein said vinylidine group-containing comonomer is styrene, vinyl-naphthalene, vinylpyridine, acrylonitrile, methacrylonitrile, methyl acrylate, or methyl methacrylate.

21. The process according to claim 3 wherein said polymer is an unquenched polymer obtained by the polymerization of said conjugated diene or of said conjugated diene with said vinylidine group-containing monomer with a lithium based catalyst under solution polymerization conditions in a hydrocarbon diluent.

22. The process according to claim 13 wherein said polymer is an unquenched polymer obtained by the polymerization of a conjugated diene with a catalyst system comprising iodine, triisobutylaluminum, and titanium tetrachloride under solution polymerization conditions.

23. The process of claim 22 wherein said polymer is polybutadiene; said (a) is NO-treated molybdenum trichloride dioctanoate, and said (b) is ethylaluminum sesquichloride.

24. The process of claim 22 wherein said polymer is polybutadiene, said (a) is NO-treated molybdenum trichloride dioctanoate, and said (b) is triisobutylaluminum.

25. The process of treating a polybutadiene, which process comprises contacting said polybutadiene with a homogeneous olefin disproportionation catalyst under treating conditions, wherein said homogeneous olefin disproportionation catalyst is (a) nitric oxide-treated molybdenum trichloride distearate and (b) ethylaluminum sesquichloride wherein the ratio of gram atoms of Al:Mo is about 5:1 such that the inherent viscosity of said polybutadiene is increased.

26. The process of treating a polyisoprene, which process comprises contacting said polyisoprene with a homogeneous olefin disproportionation catalyst under treating conditions, wherein said homogeneous olefin disproportionation catalyst is (a) NO-treated molybdenum dioctanoate trichloride and (b) is ethylaluminum sesquichloride wherein the ratio of gram atoms of Al:Mo is about 5:1 such that the inherent viscosity of said polyisoprene is increased.

27. The process of treating a butadiene/styrene copolymer, which process comprises contacting said butadiene/styrene copolymer with a homogeneous olefin disproportionation catalyst under treating conditions, wherein said homogeneous olefin disproportionation catalyst is (a) molybdenum trichloride dioctanoate treated with nitric oxide and (b) ethylaluminum sesquichloride wherein the treating conditions include a ratio of gram atoms Al:Mo of about 5:1 such that the inherent viscosity of said butadiene/styrene copolymer is increased.

28. A polymerization process which comprises:
polymerizing butadiene, isoprene, or a mixture of butadiene and styrene, in the presence of a hydrocarbon lithium catalyst under polymerization conditions thereby producing a conjugated diene polymer;

contacting the unquenched reaction mixture of the polymerization including the resulting conjugated diene polymer with an olefin disproportionation catalyst represented by
(a) NO-treated $[R(VOO)]_2MoCl_3$ wherein R is an aliphatic radical with up to 30 carbon atoms; and
(b) $R'AlX_2$, or a mixture of at least 50 mol percent $R'AlX_2$ and $R'_2AlX$, wherein R' is aryl or alkyl, X is halogen;

wherein the ratio of component (b) to component (a) is in the range of about 0.1:1 to 20:1.

29. The process of claim 28 wherein the olefin disproportionation catalyst is a mixture of ethylaluminum sesquichloride and the reaction product of nitric oxide and molybdenum trichloride dioctanoate.

30. The process of claim 28 wherein the contact with the olefin disproportionation catalyst is at a temperature in the range of 50° to 250° F.

31. The process of claim 28 wherein the conjugated diene polymer is polybutadiene.

32. The process of claim 28 wherein said conjugated diene polymer is a copolymer of butadiene and styrene.

33. The process of claim 28 wherein said olefin disproportionation catalyst is a mixture of ethylaluminum sesquichloride and the reaction product of nitric acid and molybdenum trichloride distearate.

* * * * *

UNITED STATES PATENT OFFICE
CERTIFICATE OF CORRECTION

Patent No. 4,012,566   Dated March 15, 1977

Inventor(s) Robert P. Zelinski et al.

It is certified that error appears in the above-identified patent and that said Letters Patent are hereby corrected as shown below:

Column 12, claim 2, line 29, delete "(b)-(a)" and insert therefore --- (b):(a) ---;

Column 12, claim 3, line 57, delete "n + n" and insert therefore --- n + m ---;

Column 13, claim 5, line 18, delete "$R^5(COO)_k$" and insert therefore --- $R^5(COO)\!\!\!\rightarrow_k$ ---;

Column 13, claim 8, line 31, delete "$[\pi-(CHR^4-CR^4-CH_2)]$, and insert therefore --- $[\pi-(\underline{CHR}^4\text{-}\underline{CR}^4\text{-}CH_2)\}$, ---;

Column 13, claim 8, line 32, delete "$R^5(COO)_k$, $RCOR^6(COO)_k$, $[(RCO)_2CH]$, " and insert therefore --- $R^5(COO\}_k$, $RCOR^6(COO\}_k$, $[(RCO)_2CH\}$, ---;

Column 13, claim 8, line 33, delete "$(R_2NCSS)$" and insert therefore --- $(R_2NCSS\}$ ---;

Column 13, claim 8, line 36, after "aromatic" and before "satu-" insert therefore --- or ---;

Column 14, claim 20, line 61, delete "calim 13" and insert therefore --- claim 19 ---;

UNITED STATES PATENT OFFICE
CERTIFICATE OF CORRECTION

Patent No. 4,012,566          Dated March 15, 1977

Inventor(s) Robert P. Zelinski et al.     Page 2 of 2

It is certified that error appears in the above-identified patent and that said Letters Patent are hereby corrected as shown below:

Column 14, claim 21, line 66, delete "3" and insert therefore --- 13 ---

Column 16, claim 28, line 18, delete "$[R(VOO)]_2MoCl_3$" and insert therefore --- $[R(COO)]_2MoCl_3$ ---; and Column 16, claim 33, line 37, delete "acid" and insert therefore --- oxide ---.

Signed and Sealed this

Seventh Day of June 1977

[SEAL]

*Attest:*

RUTH C. MASON          C. MARSHALL DANN
*Attesting Officer*          *Commissioner of Patents and Trademarks*